United States Patent
Lee et al.

(10) Patent No.: US 10,790,555 B2
(45) Date of Patent: Sep. 29, 2020

(54) TEMPERATURE-RAISING SYSTEM FOR BATTERY MODULE AND METHOD FOR CONTROLLING THE SYSTEM

(71) Applicant: SK INNOVATION CO., LTD., Seoul (KR)

(72) Inventors: Ji Yoon Lee, Daejeon (KR); Dong Hun Lim, Gyeonggi-do (KR); Yun Nyoung Lee, Gyeonggi-do (KR); Seung Hoon Ju, Daejeon (KR)

(73) Assignee: SK INNOVATION CO., LTD. (KR)

( * ) Notice: Subject to any disclaimer, the term of this patent is extended or adjusted under 35 U.S.C. 154(b) by 461 days.

(21) Appl. No.: 14/581,087

(22) Filed: Dec. 23, 2014

(65) Prior Publication Data

US 2015/0188199 A1    Jul. 2, 2015

(30) Foreign Application Priority Data

Dec. 27, 2013    (KR) .................. 10-2013-0165798

(51) Int. Cl.
*H01M 10/48* (2006.01)
*H05B 1/02* (2006.01)
(Continued)

(52) U.S. Cl.
CPC ....... *H01M 10/486* (2013.01); *H01M 10/615* (2015.04); *H01M 10/633* (2015.04);
(Continued)

(58) Field of Classification Search
CPC ............. H01M 10/486; H01M 10/615; H01M 10/633; H01M 10/6571
See application file for complete search history.

(56) References Cited

U.S. PATENT DOCUMENTS 5,948,298 A * 9/1999 Ijaz ............... B60L 11/1803
                                                180/68.5
8,115,455 B2    2/2012 Sellin et al.
(Continued)

FOREIGN PATENT DOCUMENTS

CN    202585679 U    12/2012
EP    2451004 A1    5/2012
(Continued)

OTHER PUBLICATIONS

Extended European Search Report, EP 14200109.8, dated Apr. 28, 2015 (7 pages).
(Continued)

*Primary Examiner* — Ula C Ruddock
*Assistant Examiner* — Thomas H. Parsons
(74) *Attorney, Agent, or Firm* — Abelman, Frayne and Schwab

(57) ABSTRACT

Disclosed is a temperature-raising system for a battery module, which includes a heater assembly including a heater and a heater cover. The temperature-raising system includes: a battery module that includes one or more batteries; two or more heater assemblies that are attached to the battery module using a fixing means; a temperature sensor that is connected to the battery module or to the heater assemblies and senses a temperature of the battery module; and a controller that receives a preset target temperature, senses the temperature of the battery module using the temperature sensor, and turns on or off the heater using a voltage of the battery module, based on the preset target temperature and the temperature of the battery module that is sensed by the temperature sensor, the preset target temperature being a temperature that the battery module is targeted to reach.

9 Claims, 6 Drawing Sheets

(51) Int. Cl.
*H01M 10/615* (2014.01)
*H05B 3/26* (2006.01)
*H01M 10/6571* (2014.01)
*H01M 10/633* (2014.01)
*H01M 10/625* (2014.01)
*H01M 2/10* (2006.01)

(52) U.S. Cl.
CPC ...... *H01M 10/6571* (2015.04); *H05B 1/0294* (2013.01); *H05B 3/26* (2013.01); *H01M 2/1077* (2013.01); *H01M 10/625* (2015.04)

(56) References Cited

U.S. PATENT DOCUMENTS

| | | | |
|---|---|---|---|
| 8,574,740 B2 | 11/2013 | Quick et al. | |
| 8,841,015 B2 | 9/2014 | Yoon | |
| 9,160,038 B2 * | 10/2015 | Buck | H01M 2/1077 |
| 9,252,408 B2 * | 2/2016 | Kinoshita | H01M 2/1077 |
| 2008/0096072 A1 * | 4/2008 | Fukusako | H01M 2/1016 429/96 |
| 2008/0226969 A1 | 9/2008 | Fattig | |
| 2012/0107665 A1 * | 5/2012 | Abe | H01M 2/1016 429/120 |
| 2013/0236753 A1 * | 9/2013 | Yue | H01M 2/1077 429/62 |
| 2015/0171489 A1 * | 6/2015 | Inaba | H01M 10/486 429/61 |

FOREIGN PATENT DOCUMENTS

| | | |
|---|---|---|
| EP | 2833374 A1 | 2/2015 |
| JP | 2005-044668 A | 2/2005 |
| JP | 2008-226712 A | 9/2008 |
| JP | 2011-243524 A | 1/2011 |
| JP | 2012195187 * | 10/2012 |
| JP | 2012-195187 A | 11/2012 |
| JP | 5176028 B2 | 4/2013 |
| KR | 1020110133127 * | 12/2011 |
| KR | 1020110133127 A * | 12/2011 |
| KR | 1108191 B1 | 2/2012 |
| KR | 2013-0055179 A | 5/2013 |
| WO | WO2012067432 * | 5/2012 |
| WO | 2013147292 A1 | 10/2013 |

OTHER PUBLICATIONS

EP 14200109.8, Office Action, dated Aug. 17, 2016 (5 pages).
Korean Office Action dated Sep. 20, 2019 issued by the Korean Patent Office in counterpart KR 10-2013-0165798 and its English-language translation.

* cited by examiner

TEMPERATURE SENSOR

ALUMINUM PATTERN PORTION

TEMPERATURE-RAISING SYSTEM FOR BATTERY MODULE AND METHOD FOR CONTROLLING THE SYSTEM

CROSS REFERENCE TO RELATED APPLICATION(S)

This application claims the benefit of Korean Patent Application No. 10-2013-0165798, filed on Dec. 27, 2013, entitled "Temperature Rising System for Battery Module and Method for Controlling the System", which is hereby incorporated by reference in its entirety into this application.

BACKGROUND OF THE INVENTION

1. Technical Field

The present invention generally relates to a temperature-raising system. More particularly, it relates to a temperature-raising system, which raises the temperature of a battery module, and a method for controlling the system.

2. Description of the Related Art

Recently, rechargeable secondary batteries have been developed and have rapidly replaced primary batteries. Secondary batteries are used as an energy source for mobile devices, electric vehicles, hybrid vehicles, electric bicycles, uninterruptible power supplies, etc. Secondary batteries are packaged into single batteries or into modules wherein a plurality of batteries is connected to each other.

As described above, batteries or battery modules of secondary batteries that are mounted in various machines or devices are commonly exposed to external environment. Thus, their performance is influenced by temperature.

SUMMARY OF THE INVENTION

Accordingly, the present invention has been made keeping in mind the above problems occurring in the related art, and the present invention proposes a temperature-raising system for a battery module that raises the temperature of a secondary battery by using the voltage of the secondary battery, without using an additional external power supply or charging device when the secondary battery is at a low temperature. The present invention proposes a method for controlling the temperature-raising system.

In order to achieve the above object, according to one aspect of the present invention, there is provided a temperature-raising system for a battery module that includes a heater assembly including a heater and a heater cover. The temperature-raising system includes: a battery module that includes one or more batteries; two or more heater assemblies that are attached to the battery module using a fixing means; a temperature sensor that is connected to the battery module or to the heater assemblies and that senses a temperature of the battery module; and a controller that receives a preset target temperature, senses the temperature of the battery module using the temperature sensor, and turns on or off the heater using a voltage of the battery module, based on the preset target temperature and the temperature of the battery module that is sensed by the temperature sensor, the preset target temperature being a target temperature that the battery module is targeted to reach.

The two or more heater assemblies may be connected in series with each other to prevent a breakdown of the temperature-raising system attributable to problems that occur in the heater assemblies.

When an abnormal operation of the temperature-raising system occurs, the controller may cause the temperature sensor to sense the temperature of the battery module and stop operation of the temperature-raising system.

The heater cover and the heater may be connected through ultrasonic welding.

The heater may include an aluminum pattern portion to generate heat and two heat-resistant PET films that are resistant to heat and that are arranged on both sides of the aluminum pattern portion.

The heat value and the power consumption of the heater may vary depending on a shape and dimension of the aluminum pattern portion.

In order to achieve the above object, according to another aspect of the present invention, there is provided a method for controlling a temperature-raising system for a battery module that includes a heater assembly including a heater and a heater cover, the method including: (a) receiving a preset target temperature of the battery module that includes one or more batteries, the preset target temperature being a target temperature that the battery module is targeted to reach; (b) sensing a temperature of the battery module; (c) turning on the heater using a voltage of the battery module to raise the temperature of the battery module when the sensed temperature is determined to be lower than the preset target temperature, based on the sensed temperature of the battery module; (d) sensing the temperature of the battery module while the battery module is being heated by the heater; and (e) turning off the heater using the voltage of the battery module so that the battery module will not be further heated when the temperature of the battery module that is sensed is determined to be equal to or higher than the preset target temperature.

The heater cover and the heater may be connected through ultrasonic welding.

The heater may include an aluminum pattern portion to generate heat and two heat-resistant PET films that are resistant to heat and that are arranged on both sides of the aluminum pattern portion.

The heat value and the power consumption of the heater may vary depending on the shape and dimension of the aluminum pattern portion.

The above and other objects, features and other advantages of the present invention will be more clearly understood from the following detailed description when taken in conjunction with the accompanying drawings.

All terms or words used in the specification and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The temperature-raising system for a battery module according to the present invention can raise the temperature of the battery module using a voltage of the battery module, without using an additional external power supply or a charging device. Accordingly, it is possible to reduce production cost of a device that uses a battery as well as prevent deterioration of the performance of the device attributable to a low temperature of the battery module.

In addition, the temperature-raising system for a battery module according to the present invention maintains a desirable operable temperature of the battery module. Therefore, the temperature-raising system enables all devices that use a battery module to exhibit maximum performance.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
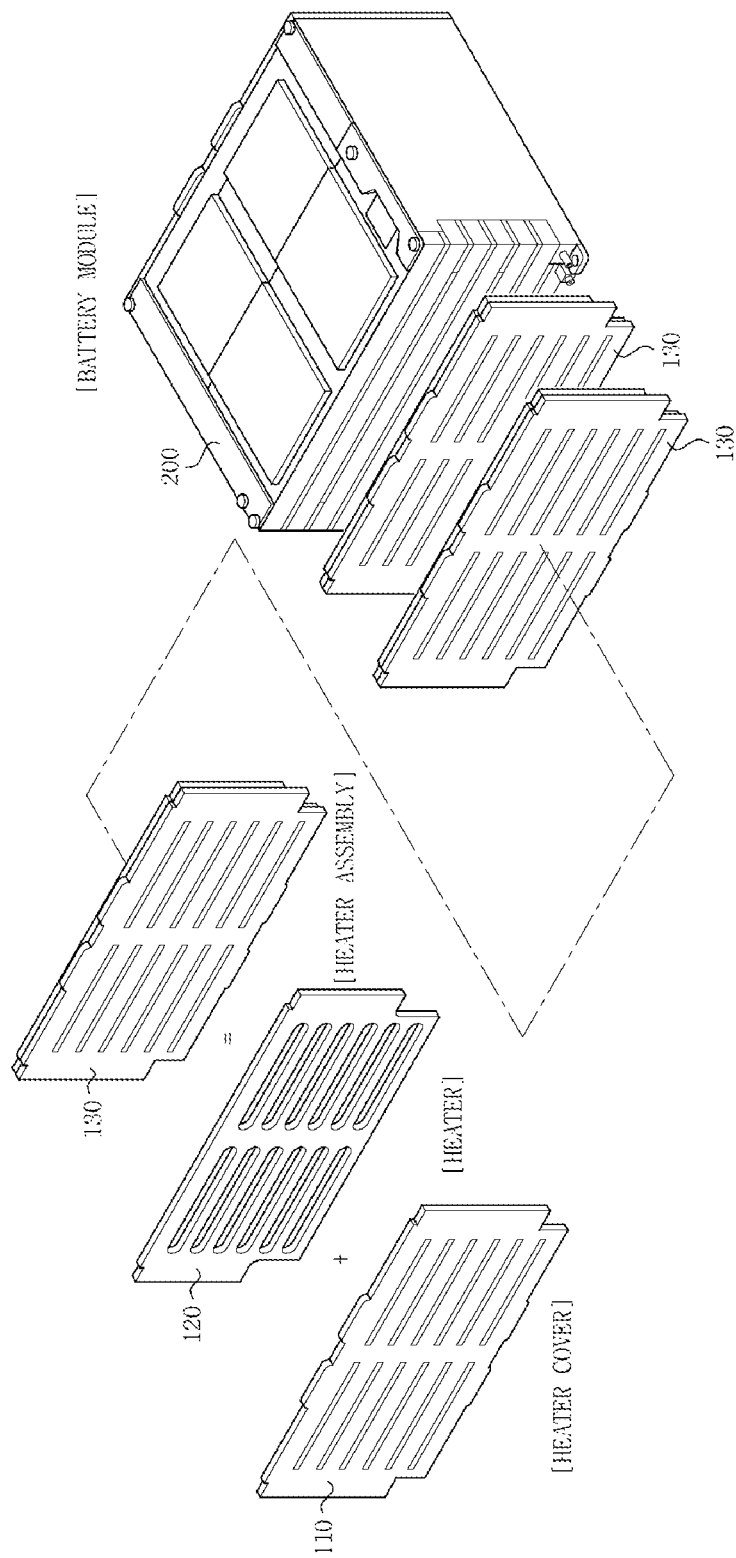
FIG. 1 is a schematic perspective view that illustrates a heater assembly attached to a battery module, in a temperature-raising system for a battery module according to one embodiment of the present invention.

The above and other objects, features and advantages of the present invention will be more clearly understood from the following detailed description taken in conjunction with the accompanying drawings.

Reference now should be made to the drawings, in which the same reference numerals are used throughout the different drawings to designate the same or similar components.

Further, it will be understood that, although the terms "first," "second," etc. may be used herein to describe various elements, these elements should not be limited by these terms.

Further, when it is determined that the detailed description of the known art related to the present invention might obscure the gist of the present invention, the detailed description thereof will be omitted.

Hereinbelow, exemplary embodiments of the present invention will be described in detail with reference to the accompanying drawings.

Construction and Function of Temperature-Raising System for Battery Module

Figure 2:
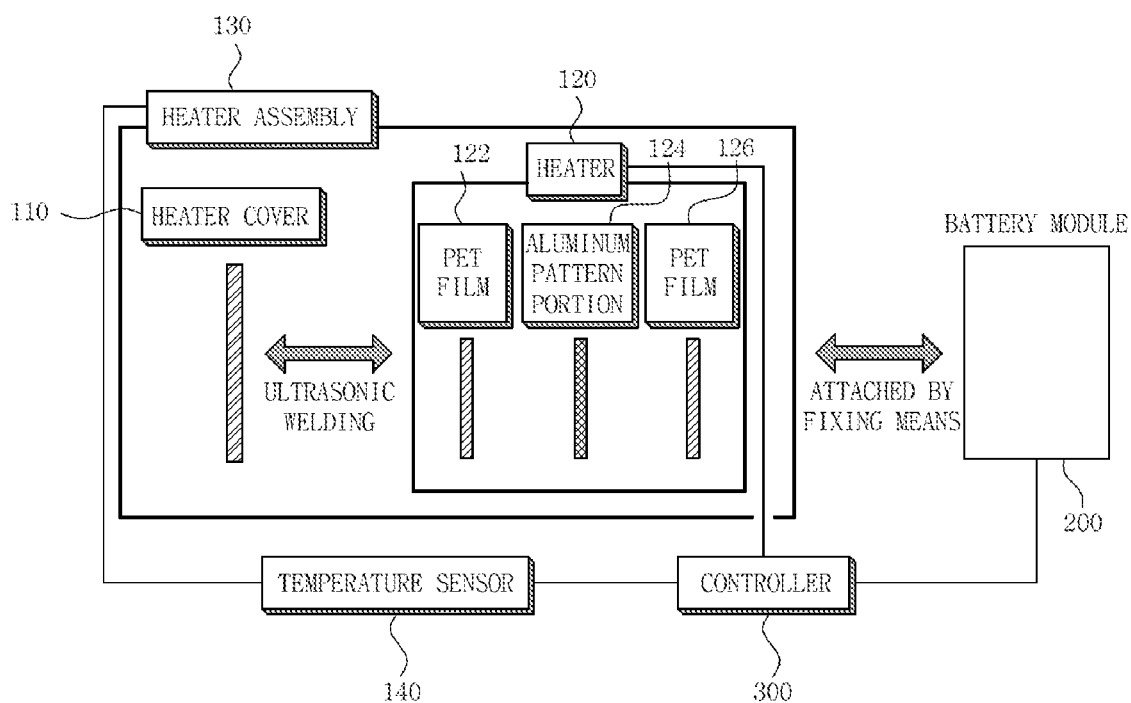
FIG. 2 is a schematic block diagram that illustrates the temperature-raising system according to the embodiment.
Figure 3:
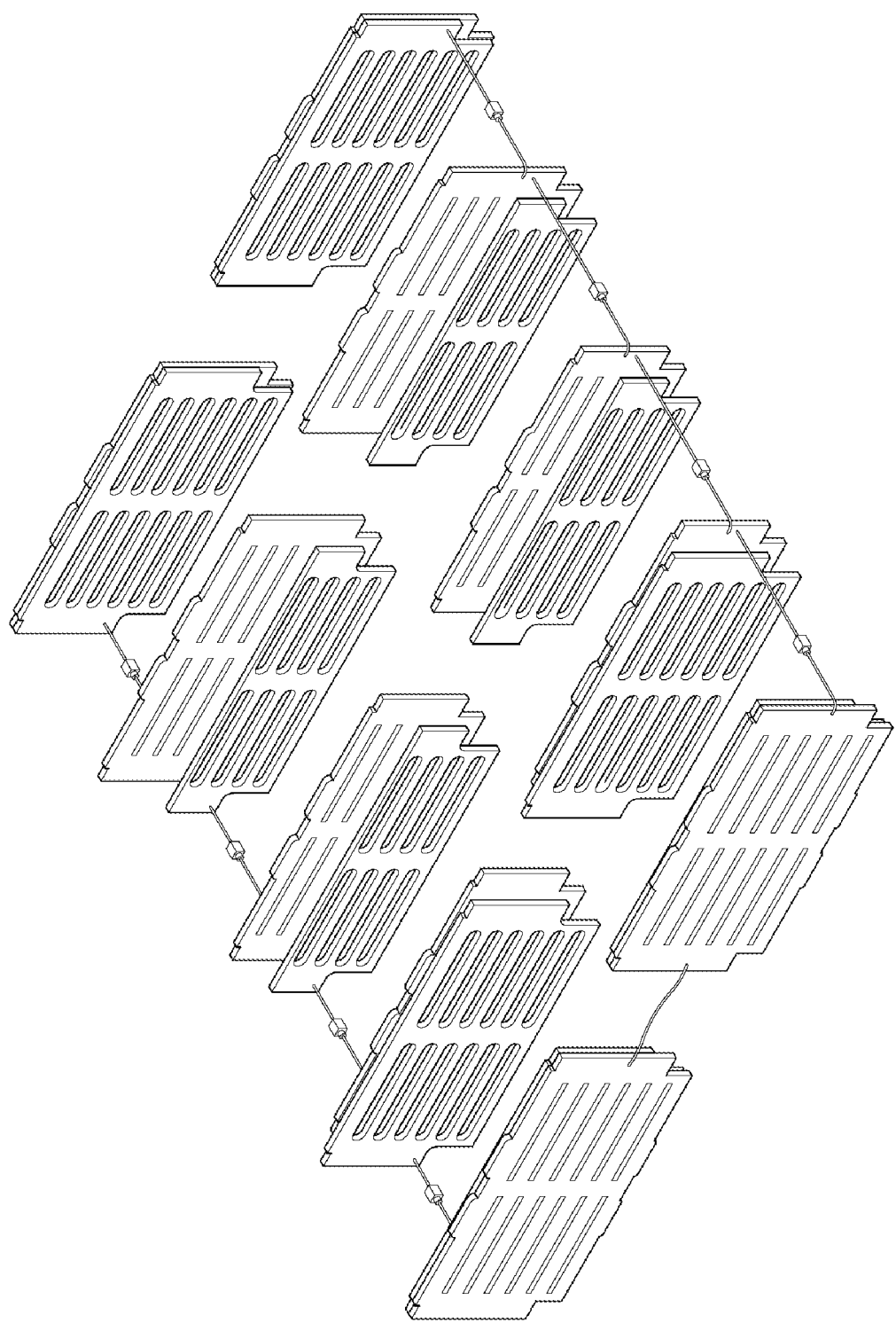
FIG. 3 is a schematic perspective view that illustrates the temperature-raising system according to the embodiment, which includes two or more heater assemblies that are connected in series with each other.

As illustrated in FIGS. 1 to 3, a temperature-raising system for a battery module according to one embodiment includes two or more heater assemblies 130 that are connected in series with each other. Thus, when problems occur in one heater assembly, causing an electrical disconnection of the heater assembly, heaters will not operate even though a voltage of a battery module 200 is applied to the heater assemblies 130. That is, the two heater assemblies 130 are connected in series with each other so that a breakdown of the temperature-raising system attributable to problems occurring in the heater assemblies will be prevented. The heater assembly 130 is made up of a heater cover 110 and a heater 120. The heater cover 110 is typically made of thermosetting plastic, and it is desirable that the heater 120 be connected to the heater cover 110 through ultrasonic welding.

Figure 4:
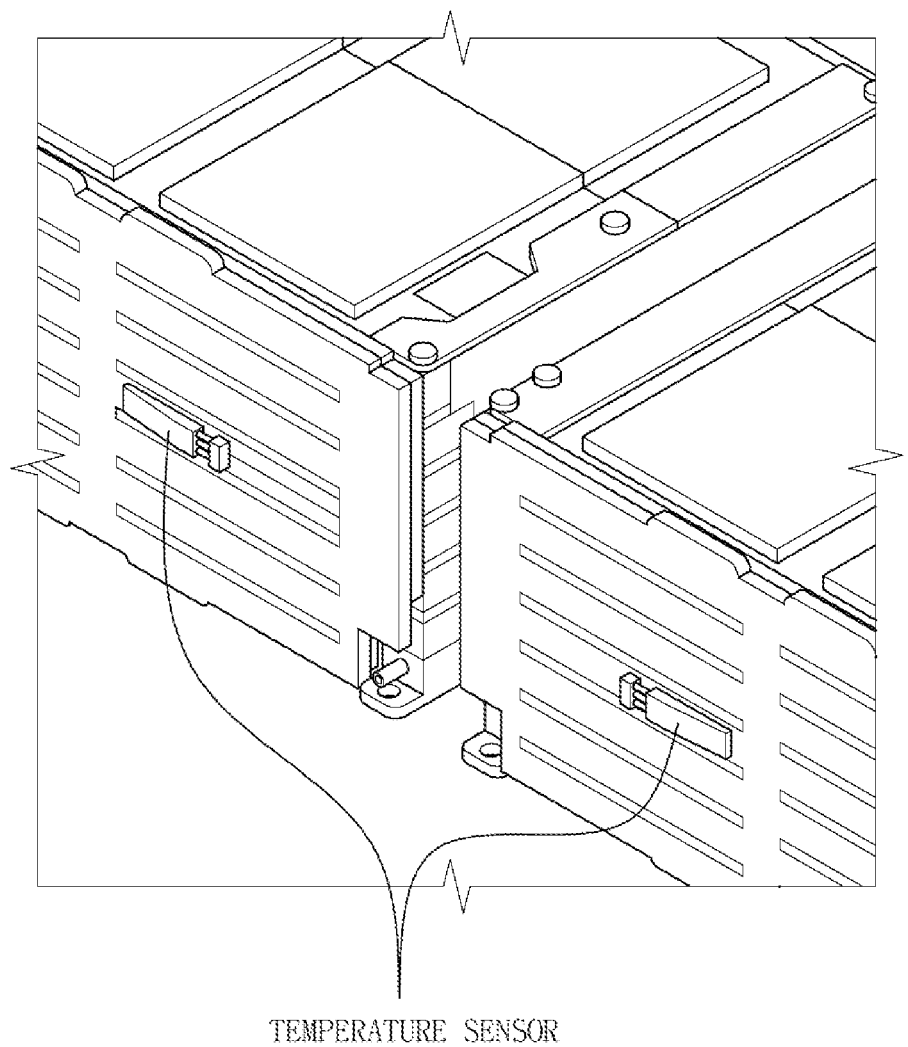
FIG. 4 is a perspective view that illustrates a temperature sensor of the temperature-raising system according to the embodiment.

As illustrated in FIG. 2, the temperature-raising system additionally includes a battery module 200 to which the two or more heater assemblies 130 are attached by a fixing means, for example, a screw, a bolt, and an adhesive. The battery module 200 includes one or more batteries. In addition, the temperature-raising system includes a temperature sensor 140 that is connected to the battery module 200 or heater assembly (or heater assemblies) 130 and that senses the temperature of the battery module 200. Although the position where the temperature sensor 140 is attached or located is not particularly limited, as illustrated in FIG. 4, it is preferable that the temperature sensor 140 be attached to or located outside the external surface of the outermost heater assembly 130 of the plural heater assemblies so as to accurately sense the temperature of the battery module 200.

The temperature-raising system additionally includes a controller 300. The controller 300 includes a data storage unit like a memory chip (not shown) that can store data such as a preset target temperature of the battery module 200. As illustrated in FIG. 2, the controller 300 is connected to the temperature sensor 140, the battery module 200, and the heater 120. The preset target temperature is an input value that is input to the controller 300 in advance. It is a specific value that a user sets for certain purposes. For example, it may be, but not limitedly, an intended, estimated, sensed, experimented temperature at which batteries are expected to operate at their maximum performance. That is, it may be any value defined by a user. Accordingly, the preset target temperature may vary depending on the input value stored in the data storage unit. The present disclosure herein provides an example in which the preset temperature is stored in the data storage unit built in the controller, but the preset target temperature may be stored in a data storage unit installed outside the controller.

The controller 300 receives the preset target temperature that is read out of the data storage unit and causes the temperature sensor 140 to sense a current temperature of the battery module 200. Then, the controller 300 turns on and off the heater 120, using a voltage of the battery module, based on the preset target temperature and the current temperature. The controller 300 compares the preset target temperature and the current temperature that is sensed, and automatically controls operation of the heater using a voltage of the battery module, based on the preset target temperature and the current temperature. That is, the controller 300 automatically turns on the heater if it is necessary.

Specifically, the controller 300 receives from the data storage unit the preset target temperature which the battery module 200 is targeted to reach, continuously senses the temperature of the battery module 200 using the temperature sensor 140, and compares the sensed current temperature and the preset target temperature. Subsequently, when the controller 300 determines that the sensed current temperature is lower than the preset target temperature, the controller 300 turns on the heater 120 using the voltage of the battery module so that the battery module 200 can be heated to the preset target temperature. Subsequently, the controller 300 continuously senses the temperature of the battery module that is gradually heated and turns off the heater 120 using the voltage of the battery module 200 to prevent the battery module from being excessively heated when it is determined that the sensed temperature is equal to or higher than the preset target temperature. That is, the controller 300 controls the total operation of the heater 120 using the voltage of the battery module 200.

In addition, when the temperature-raising system malfunctions, i.e., when the heat value is excessive due to the malfunctioning of the battery module or the heater, the controller 300 senses the temperature and stops operation of the temperature-raising system, i.e. operation of the battery module or heater.

As illustrated in FIG. 2, the heater 120 includes a pattern portion 124, which has an aluminum pattern to generate heat, and two heat-resistant PET (polyether) films 122 and 126 that are resistant to heat and arranged on both sides of the aluminum pattern portion 124, respectively or on the front and rear sides of the aluminum pattern portion 124, respectively. The heat resistant-temperature, which the heat-resistant PET films can endure, is 100 to 200° C., preferably 120 to 150° C., and most preferably 130° C.

Figure 5:
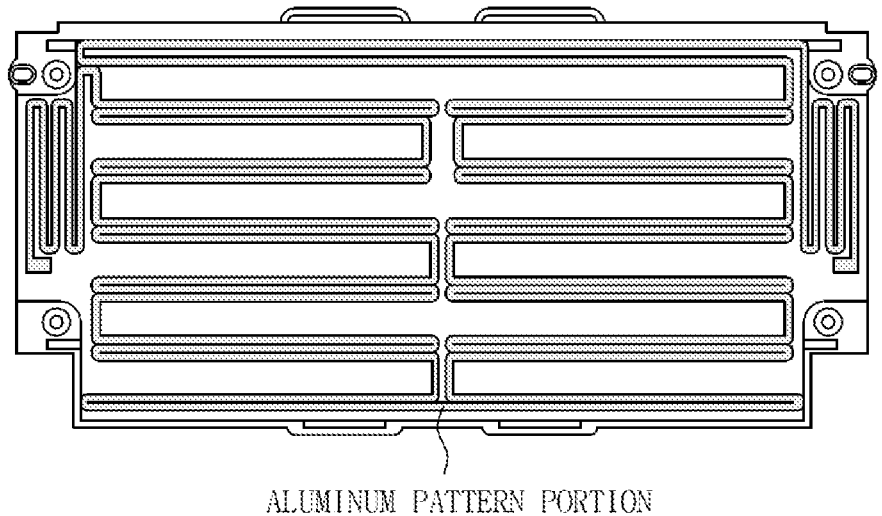
FIG. 5 is a front view that illustrates a heater that has an aluminum pattern form.

Since the aluminum pattern portion 124 of the heater 120 generates heat, the heat value or power consumption of the heater varies depending on a shape and dimension of the aluminum pattern portion 124. That is, when the aluminum pattern portion 124 is designed taking consideration of the shape and dimension of the aluminum pattern portion, such as width, length, and thickness, a heat value and power consumption of the heater can be obtained. An example of the shape and dimension of the aluminum pattern portion is shown in FIG. 5.

Because of the above-described structure, the temperature-raising system for a battery module according to the present invention can raise the temperature of the battery module using the voltage of the batteries in the battery module, without using an additional charging device. Accordingly, production cost of the device that uses the battery module is reduced. In addition, performance degradation of the batteries in the battery module can be prevented. Furthermore, since the target rising temperature of the battery module is preset, an external device that uses a battery module or battery can exhibit its maximum performance.

Method for Controlling Temperature-Raising System for Battery Module

Figure 6:
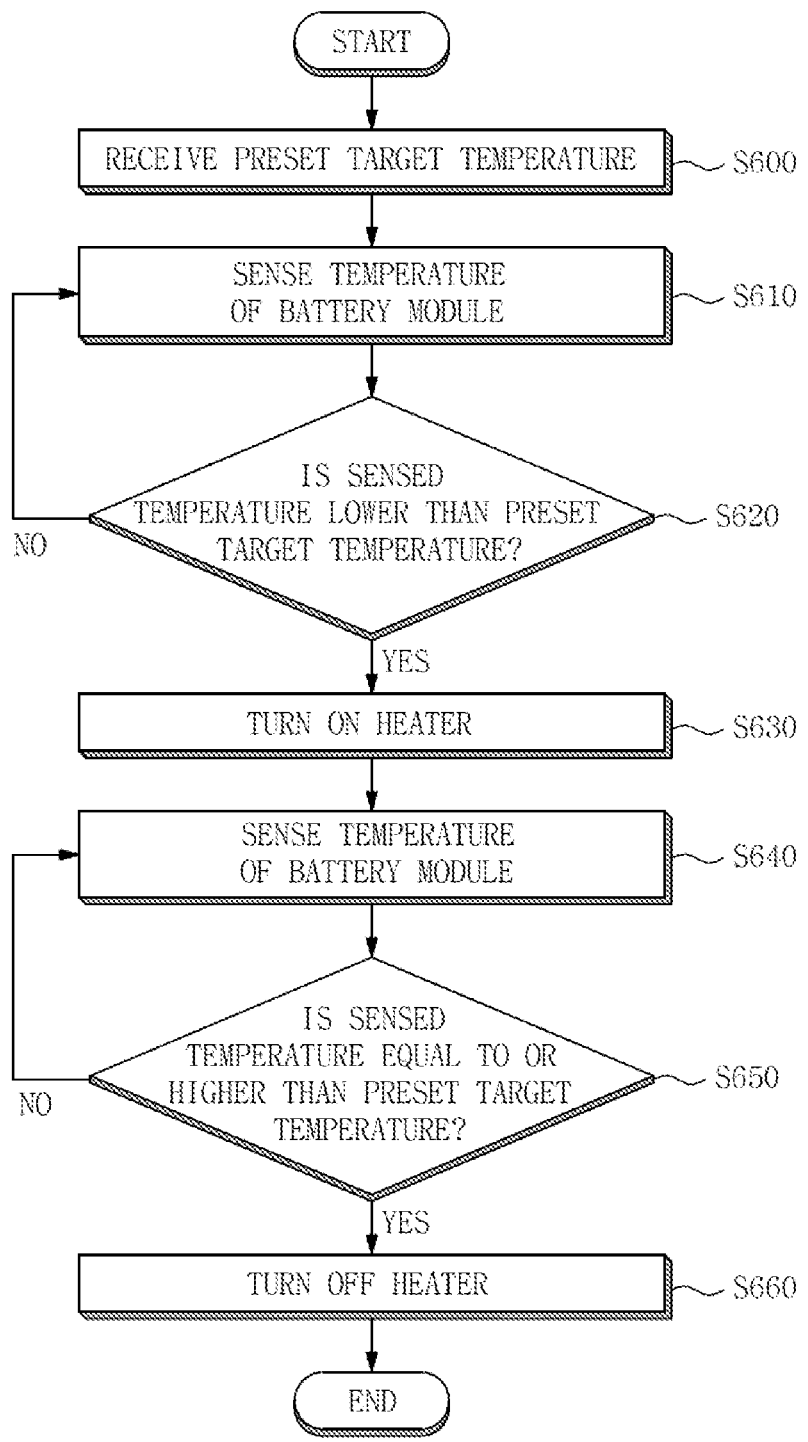
FIG. 6 is a flowchart that illustrates a method for controlling the temperature-raising system according to one embodiment.

As illustrated in FIG. 6, the controller 300 of the temperature-raising system according to the invention receives a preset target temperature, which the battery module 200 that includes one or more batteries is targeted to reach, from a data storage unit at Step S600. Next, the controller 300 senses the temperature of the battery module 200 at Step S610.

Subsequently, the controller 300 determines whether the sensed temperature is lower than the preset target temperature or not at Step S620. When it is determined to be YES, the controller 300 turns on the heater 120 to raise the temperature of the battery module 200 at Step S630. Conversely, when it is determined to be NO at Step S620, that is, when it is determined that the sensed temperature is equal to or higher than the preset target temperature, the controller 300 returns to perform Step S610.

Next, the controller 300 senses the temperature of the battery module that is being increased by the heater 120 at Step S640. Next, the controller 300 determines whether the sensed temperature is equal to or higher than the preset target temperature or not at Step S650. When it is determined to be YES, the controller 300 proceeds to perform Step S660. At Step S660, the controller 300 turns off the heater 120 using the voltage of the battery module 200, so that the battery module 200 is heated no further. When it is determined to be NO at Step S650, i.e., when the sensed temperature is lower than the preset target temperature at Step S650, the controller 300 returns to perform Step S640.

Hereinabove, elements in the embodiments of the present invention have been described in appropriate terms in context to the relevant art but can be described in different terms. Any devices that perform the same or similar functions would be regarded as the same device. For example, although the terms "heater" and "battery module" are used herein for illustrative purposes, they may also be referred to as other terms. For example, "heater" may also be referred to as "heating device," "heating unit," "heating means," etc; "battery module" may be referred to as "battery unit," "battery pack," "energy storage unit," "energy storage device," "electric capacitor," etc.

The method described above can be executed using various means, depending on its applications. For example, the method may be executed by hardware, firmware, software, or combinations of these. When the method is executed by a hardware device, the control circuit or controller may be implemented into one or more Application Specific Integrated Circuits (ASIC's), Digital Signal Processors (DSP's), Field Programmable Gate Arrays (FPGA's), processors, controllers, microcontrollers, microprocessors, electronic devices, electronic units that are designed to perform the same function described above, or combinations of these.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, although the temperature-raising system according to the present invention has been described to be used for a battery module of secondary batteries, the temperature-raising system may also be used for battery modules that use various types of batteries as well as secondary batteries.

Further, simple changes and modifications of the present invention are appreciated as included in the scope and spirit of the invention, and the protection scope of the present invention will be defined by the accompanying claims.

What is claimed is:

1. A temperature-raising system for a battery module that includes a heater assembly including a heater and a heater cover, the temperature-raising system comprising:
   a battery module that includes one or more batteries;
   two or more heater assemblies that are attached to the battery module using a fixing means;
   a temperature sensor that is connected to the battery module or to the heater assemblies and senses a temperature of the battery module; and
   a controller that receives a preset target temperature, senses the temperature of the battery module using the temperature sensor, and turns on or off the heater using a voltage of the battery module, based on the preset target temperature and the temperature of the battery module that is sensed by the temperature sensor, the preset target temperature being a temperature that the battery module is targeted to reach,
   wherein the two or more heater assemblies are connected in series with each other to prevent a breakdown of the temperature-raising system attributable to problems that occur in the heater assemblies, the heater assemblies are attached to at least one side of the battery module
   wherein the heater includes an aluminum pattern portion to generate heat and at least one heat-resistant film that is resistant to heat and arranged on at least one side of the aluminum pattern portion, wherein the heater cover and the heater are connected to each other through ultrasonic welding.

2. The temperature-raising system according to claim 1, wherein when an abnormal operation of the temperature-raising system occurs, the controller causes the temperature sensor to sense the temperature of the battery module and stops operation of the temperature-raising system.

3. The temperature-raising system according to claim 1, wherein the heater cover and the heat-resistant film of the heater are connected to each other through ultrasonic welding.

4. The temperature-raising system according to claim 1, wherein the heat resistant film is heat-resistant PET film, and is arranged on both sides of the aluminum pattern portion.

5. The temperature-raising system according to claim 4, wherein a heat value and power consumption of the heater vary depending on a shape and dimension of the aluminum pattern portion.

6. A method for controlling a temperature-raising system for a battery module that includes a heater assembly including a heater and a heater cover, the method comprising:
  (a) receiving a preset target temperature of the battery module that includes one or more batteries, the preset target temperature being a temperature that the battery module is targeted to reach;
  (b) sensing a temperature of the battery module;
  (c) turning on the heater using a voltage of the battery module to raise the temperature of the battery module when the sensed temperature is determined to be lower than the preset target temperature, based on the sensed temperature;
  (d) sensing the temperature of the battery module while the battery module is being heated by the heater; and
  (e) turning off the heater using a voltage of the battery module so that the battery module is not further heated when the temperature of the battery module which is sensed is determined to be equal to or higher than the preset target temperature, wherein two or more heater assemblies are attached to at least one side of the battery module, the two or more heater assemblies are connected in series with each other to prevent a breakdown of the temperature-raising system attributable to problems that occur in the heater assemblies, wherein the heater includes an aluminum pattern portion to generate heat and at least one heat-resistant film that is resistant to heat and arranged on at least one side of the aluminum pattern portion, wherein the heater cover and the heater are connected to each other through ultrasonic welding.

7. The method for controlling a temperature-raising system according to claim 6, wherein the heater cover and the heat-resistant film of the heater are connected to each other through ultrasonic welding.

8. The method for controlling a temperature-raising system according to claim 6, wherein the heat-resistant film is heat-resistant PET film, and is arranged on both sides of the aluminum pattern portion.

9. The method for controlling a temperature-raising system according to claim 8, wherein a heat value and power consumption of the heater vary depending on a shape and dimension of the aluminum pattern portion.

* * * * *